United States Patent [19]

Okamoto

[11] 4,405,885

[45] Sep. 20, 1983

[54] BRUSHLESS DC MOTOR

[75] Inventor: Hiroshi Okamoto, Yao, Japan

[73] Assignee: Matsushita Electric Industrial Co., Ltd., Osaka, Japan

[21] Appl. No.: 284,531

[22] Filed: Jul. 20, 1981

[30] Foreign Application Priority Data

Jul. 23, 1980 [JP] Japan .............................. 55-101615
Oct. 17, 1980 [JP] Japan .............................. 55-146165

[51] Int. Cl.³ .......................................... H02K 29/00
[52] U.S. Cl. .................................. 318/254; 318/138
[58] Field of Search ................. 310/68 R; 318/254 A, 318/254, 138

[56] References Cited

U.S. PATENT DOCUMENTS 4,074,173 2/1978 Janssen ................................ 318/138
4,080,553 3/1978 Lyman ................................ 318/138
4,242,608 12/1980 Ishigaki et al. .................... 310/68 R Primary Examiner—J. V. Truhe
Assistant Examiner—Saul M. Bergmann
Attorney, Agent, or Firm—Wenderoth, Lind & Ponack

[57] ABSTRACT

A three-phase brushless dc motor using two position detecting elements to obtain the signal necessary for sequentially energizing the motor and capable of obtaining one reference pulse signal for every rotation of the motor, the reference pulse signal being used for phase detection of the motor. More particularly, the present invention allows the two position detecting elements to be disposed radially in the same direction and on the same plate so as to reduce mounting errors between the two position detecting elements, thereby improving the performance of the resulting brushless dc motor and reducing its manufacturing costs.

6 Claims, 5 Drawing Figures

BRUSHLESS DC MOTOR

BACKGROUND OF THE INVENTION

This invention relates to a three-phase brushless dc motor using two position detecting elements to obtain the signal necessary for sequentially energizing the motor and being capable of obtaining one PG reference pulse signal for every rotation of the motor, said PG pulse being used for phase detection of the motor. That is, the PG reference pulse indicates when a predetermined reference point on the motor passes a fixed point.

Conventionally, a brushless dc motor with three-phase exciting windings usually has three position detecting elements, disposed at intervals of an electric angle of $2\pi/3$, which are arranged to detect a three-phase position signal corresponding to the rotating position of the rotor to thereby cause currents to flow sequentially in the three-phase exciting windings in the width of the electric angle of $2\pi/3$.

Such a three-phase brushless dc motor needs the three position detecting elements which are required to be disposed at regular angular phase differences with a high mechanical accuracy, a small-sized motor requiring a particularly high accuracy, thereby creating a problem of a high manufacturing cost. For example, in the case where the three-phase brushless dc motor directly drives the rotary magnetic heads of a video tape recorder, a signal indicating the rotary phase of the rotary magnetic head is required in view of its function to thereby need a reference pulse signal output (to be hereinafter called the PG pulse) for every rotation of the motor. A simple method to obtain the PG pulse signal is to use the two-pole-magnetized permanent magnet which is also used for the motor, the magnetic flux of the permanent magnet being detected by sensitive elements. Such a motor, however, does not have a large flywheel effect due to the low ripple frequency of the torque generated by the motor when a small number of magnetic poles are used. Hence, a three-phase brushless dc motor with a rotary magnet of four or more poles is generally adopted, and which is provided with a small magnetic piece located on its rotary portion to thereby detect the magnetic flux, thus obtaining an accurate rotation of the motor and a PG reference pulse signal. This method, however, is defective in that the mounting of the magnetic piece on the rotary portion deteriorates its dynamic balance, and increases the number of parts and the manufacturing processes so as to thereby cause a high manufacturing cost.

SUMMARY OF THE INVENTION

A three-phase brushless dc motor of the present invention has been designed to use two position detecting elements for obtaining two kinds of position signals, so that each output signal excites three-phase exciting windings stably and efficiently, and even if the magnet constituting the motor's rotor is of four or more poles, the reference position signal is processed by a logic circuit so as to thereby obtain the PG reference pulse signal. More particularly, in comparison with a conventional brushless dc motor, the number of needed position detecting elements is reduced to two so as to result in a low production cost and the two position detecting elements are constructed, for example, so as to be disposed radially in the same direction to reduce the mounting error between the two position detecting elements, thereby enabling an improvement in the performance of the resulting brushless dc motor and the miniaturization thereof.

BRIEF DESCRIPTION OF THE DRAWINGS

Next, this invention will be detailed on a basis of an embodiment shown in the drawings in which.

DESCRIPTION OF THE PREFERRED EMBODIMENTS

Figure 1:
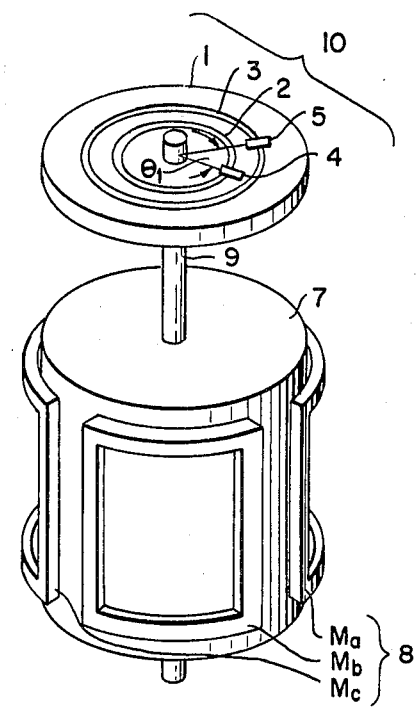
FIG. 1 is a perspective view of a principal portion of an embodiment of a brushless dc motor of the invention.

FIG. 1 is a perspective view of a principal portion of a first embodiment of a three-phase brushless dc motor of the present invention, in which a position detecting rotary member 1 comprises a ferromagnetic substance. The rotary member 1 rotates integrally with a rotary shaft 9 and is provided with a first position detecting track 2 and a second position detecting track 3, said tracks being concentric, and said first and second position detecting tracks 2 and 3 being magnetized in coded N and S poles respectively. A first position detecting element 4, comprising a magnetic sensitive element using the Hall effect, is disposed so as to detect the coded magnetic poles of the first position detecting track 2. A second position detecting element 5, comprising a magnetic sensitive element using the Hall effect, is disposed so as to detect the coded poles of the second position detecting track 3. A rotor 7, comprising a cylindrical permanent magnet of four poles magnetized on the outer periphery, is rotatable integrally with the rotary shaft 9. A stator 8, comprises three-phase exciting windings $M_a$, $M_b$, and $M_c$, and may include a stator core. The position detecting rotary member 1, the first position detecting element 4, and the second position detecting element 5, constitute a position detecting means 10.

Figure 2:
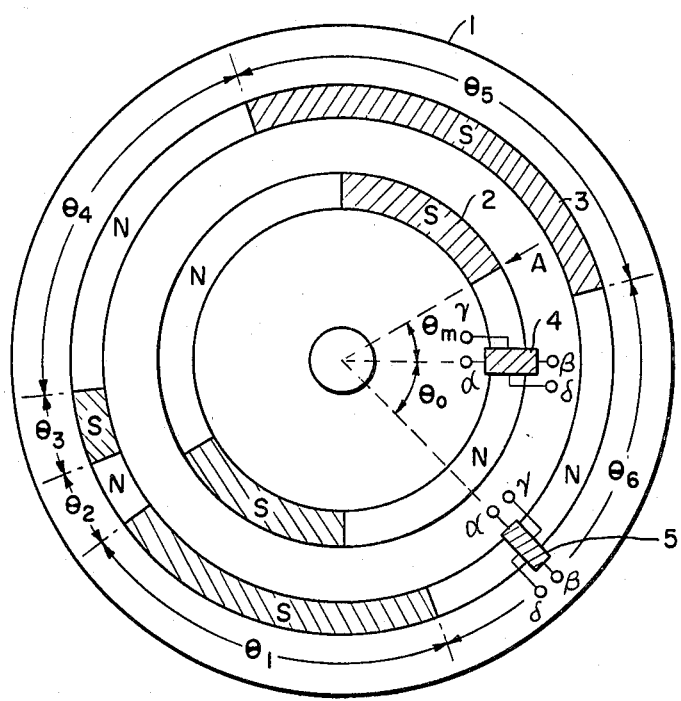
FIG. 2 is a detail view of a position detecting means of the FIG. 1 embodiment.

FIG. 2 is a detail view of the position detecting means in FIG. 1, in which the same components as in FIG. 1 are designated by the same reference numerals. A first position detecting track 2 in FIG. 2 is magnetized so as to have four poles, and is so magnetized that the S and N poles are disposed at central angles having a ratio of 1 to 2. The first and second position detecting elements 4 and 5, respectively having input terminals ($\alpha$) and ($\beta$) and output terminals ($\gamma$) and ($\delta$), are disposed at a phase angle difference of $\theta_0$, as shown in FIG. 2. In FIG. 2, a position shown by reference A is called the reference position of the first position detecting track 2, the angular phase of position A with respect to the first position detecting element 4 is represented by the angle $\theta_m$ which is counterclockwise from element 4. The second position detecting track 3 is magnetized so as to have 6 poles arranged so that S poles are at central angles of $\theta_1$, $\theta_3$ and $\theta_5$ and N poles are at central angles of $\theta_2$, $\theta_4$ and $\theta_6$ respectively, the angles $\theta_1$ through $\theta_6$ having the following relationships: $\theta_1+\theta_2+\theta_3+\theta_4=\pi$, $\theta_5+\theta_6=\pi$, $\pi/3<\theta_1<2\pi/3$, $0<\theta_2+\theta_3<\pi/3$ ($\theta_2$, $\theta_3>0$), $\pi/3<\theta_1+\theta_2+\theta_3<2\pi/3$, and $\pi/3<\theta_5<2\pi/3$.

The relative magnetization positions of the second position detecting track 3 to the first position detecting track 2 are so defined that at each position where $\theta_m$ is $\pi/3$, $4\pi/3$ or $\theta_1+\theta_2+\pi/3$, the polarity detected by the second position detecting element 5 changes from N pole to S pole, and at each position where $\theta_m$ is $\theta_1+\pi/3$, $\theta_1+\theta_2+\theta_3+\pi/3$, or $\theta_5+4\pi/3$, the polarity detected by the element 5 changes from S pole to N pole.

Figure 3:
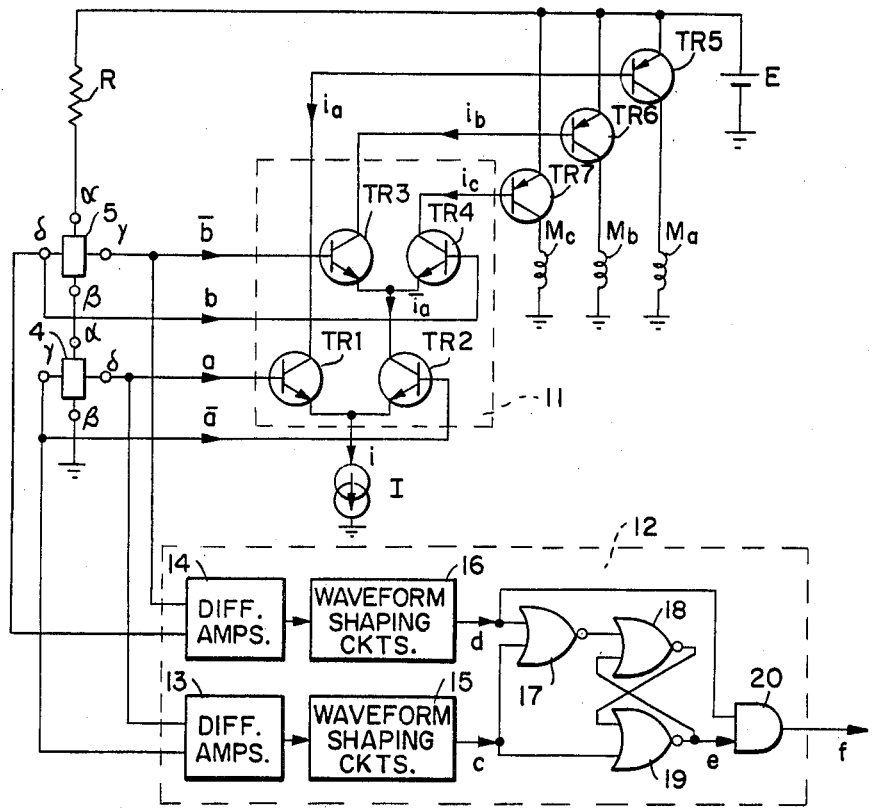
FIG. 3 is a circuit diagram of a current divider and PG signal generating means in the same embodiment.
Figure 4:
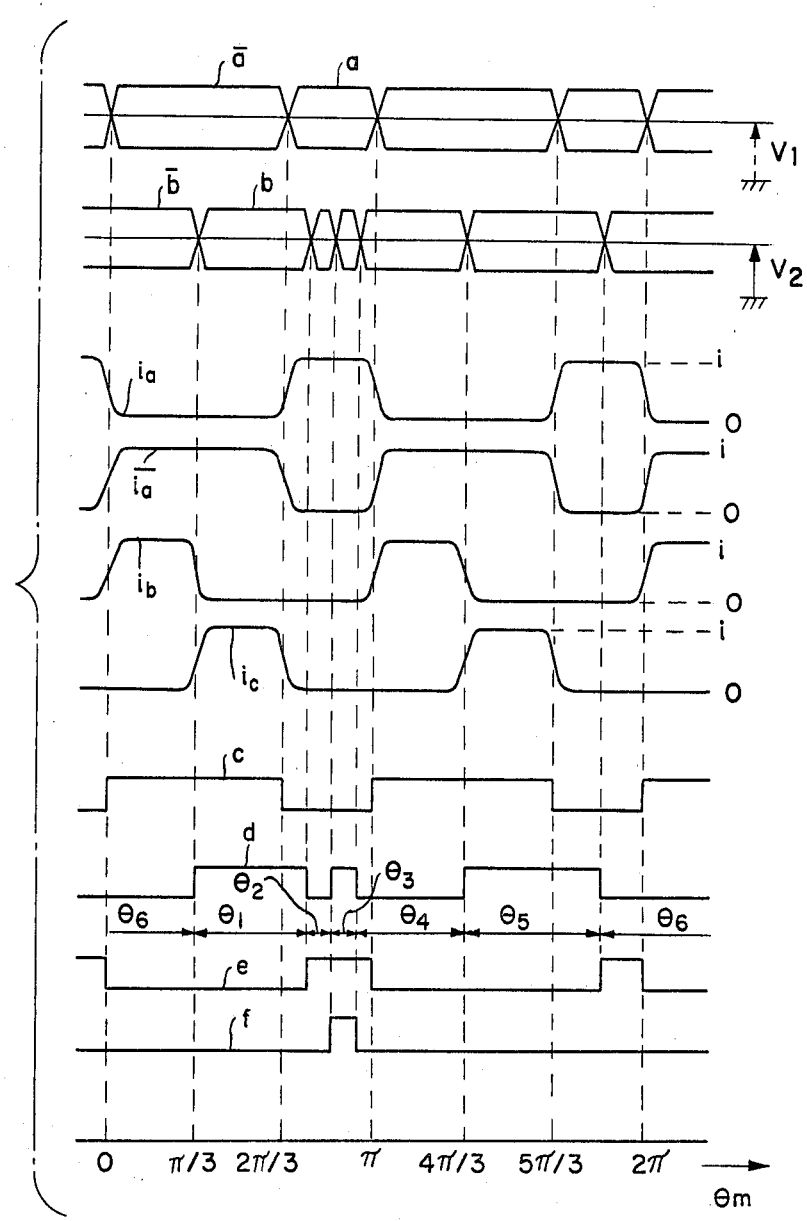
FIG. 4 illustrates the signal waveforms at specific points in FIG. 3.

FIG. 3 is a block diagram of the principal circuit of the embodiment of the invention, and FIG. 4 represents the waveforms of the principal portions in FIG. 3.

In FIG. 3, one terminal of a DC power source E is grounded. The first position detecting element 4 has one input terminal ($\beta$) grounded and has its other input terminal ($\alpha$) connected to one input terminal ($\beta$) of the second position detecting element 5; the other input terminal ($\alpha$) of element 5 is connected to the ungrounded terminal of the DC power source E through a resistance R. NPN transistors TR1 and TR2 constitute a first differential amplifier circuit and transistors TR3 and TR4 consititute a second differential amplifier circuit. The emitters of NPN transistors TR1 and TR2 are connected in common to the ungrounded terminal of a current supply I which has its other terminal grounded. The base of transistor TR1 is connected to the output terminal ($\delta$) of the first position detecting element 4 and the base of transistor TR2 is connected to the output terminal ($\gamma$) of the first position detecting element 4. The emitters of NPN transistors TR3 and TR4 are connected in common to the collector of transistor TR2. The base of transistor TR3 is connected to one output terminal ($\gamma$) of the second position detecting element 5 and the base of transistor TR4 is connected to the other output terminal ($\delta$) of the second position detecting element 5. In addition, a current divider 11 comprises the aforementioned transistors TR1, TR2, TR3 and TR4.

PNP transistors TR5, TR6 and TR7, which are used for current amplification, have their emitters connected to the ungrounded terminal of the DC power source and have their collectors grounded through the three-phase stator windings $M_a$, $M_b$, and $M_c$ as shown in FIG. 3. Furthermore, the base of PNP transistor TR5 is connected to the collector of NPN transistor TR1, and the base of PNP transistor TR6 is connected to the collector of NPN transistor TR3, and the base of PNP transistor TR7 is connected to the collector of NPN transistor TR4.

A PG signal generating means 12 comprises a differential amplifier 13 for differentially amplifying differential signals a, a generated at the output terminals ($\gamma$), ($\delta$) of the first position detecting element 4, a waveform shaping circuit 15 for waveform shaping an output of the differential amplifier 13, a differential amplifier 14 for differentially amplifying differential signals b, $\overline{b}$ generated at the output terminals ($\gamma$), ($\delta$) of the second position detecting element 5, a waveform shaping circuit 16 for shaping an output signal of the differential amplifier 14, two-input NOR gate circuits 17, 18 and 19 and a two-input AND circuit 20. NOR gate circuit 17 has one input terminal connected to an output terminal of the waveform shaping circuit 16 and has its other input terminal connected to an output terminal of the waveform shaping circuit 15. NOR gate circuit 18 has one input terminal connected to an output terminal of NOR gate circuit 17 and has its other input terminal connected to an output terminal of NOR gate 19. NOR gate circuit 19 has one input terminal connected to an output terminal of the waveform shaping circuit 14 and has its other input terminal connected to an output terminal of NOR gate circuit 18. Input terminals of AND gate circuit 20 are respectively connected to the output terminal of the waveform shaping circuit 16 and the output terminal of NOR gate circuit 19.

From the above construction, differential signals a, a of bias potential $V_1$ and of a mutually opposite phase relationship, as shown in FIG. 4, are output from the output terminals ($\gamma$) and ($\delta$) of the first position detecting element 4 corresponding to the rotating position of the position detecting rotary member 1. The first position detecting element 4, when signal a is higher in potential than $V_1$, detects S poles at the first position detecting track 2, and when lower, detects N poles. During one rotation of position detecting rotary member 1, an S pole is detected in zones where $\theta_m$ is between $2\pi/3$ and $\pi$ and between $5\pi/3$ and $2\pi$. Differential signals, b, $\overline{b}$ of bias voltage $V_2$ (where $V_2>V_1$) and of a mutually opposite phase relationship, as shown in FIG. 4, are output terminals ($\gamma$), ($\delta$) of the second position detecting element 5. When the second position detecting element 5 detects an S pole at the second position detecting track 3, signal b is higher in potential than $V_2$, and when detecting an N pole at the track 3, signal b is lower in potential than $V_2$. As seen from the signals a, b in FIG. 4, at the center of the zone where the first position detecting element 4 detects an N pole, in other words, at the position of $\theta_m=\pi/3$ or $\theta_m=4\pi3$, a polarity detecting state of the second position detecting element 5 changes once from N pole to S pole. In a zone where the first position detecting element 4 detects an S pole, that is, in a range of $2\pi/3<\theta_m<\pi$, the pole detecting state of the second position detecting element 5 changes three times, i.e. —from S pole to N pole at $\theta_m=\theta+\pi/3$, from N pole to S pole at $\theta_m=\theta_1+\theta_2+\pi/3$, and from S pole to N pole at $\theta_m=\theta_1+\theta_2+\theta_3+\pi/3$. Furthermore, in a range of $5\pi/3<\theta_m<2\pi$, the polarity detecting state of the second position detecting element 5 changes once from S pole to N pole at $\theta_m=\theta_5+4\pi/3$.

The signals a, a are fed to transistors TR1, TR2 constituting the first differential amplifier circuit, so that an output current i from current supply I is differential-output as collector currents $i_a$, $\overline{i_a}$ for transistors TR1 and TR2. In other words, within a period of time when the first position detecting element 4 detects an S pole, a current i is output as the collector current of transistor TR1, and when detecting an N pole, the current i is output as the collector current transistor TR2. The collector current of transistor TR2 is controlled according to the base potential of respective transistors TR3, TR4 so that currents $i_b$, $i_c$, as shown in FIG. 4, are differentially-output from the collectors of transistors TR3, TR4. In other words, currents $i_a$, $i_b$ and $i_c$, as shown in FIG. 4, become three-phase currents having phase differences of about $2\pi/3$ in an electrical angle, and are fed to the bases of the respective PNP transistors so that stator windings Ma, Mb and Mc are sequentially energized for each period of about $2\pi/3$ in an electrical angle corresponding to the rotational position of rotor 7, thus stably rotating rotor 7.

Output signals a, $\overline{a}$ of the first position detecting element 4 are amplified by differential amplifier 13, the output therefrom being waveform shaped by waveform shaping circuit 15, thereby obtaining a signal c which is at a high level when the first position detecting element 4 is detecting an N pole and is at a low level when element 4 is detecting an S pole. Output signals b, $\bar{b}$ of the second position detecting element 5 are amplified by differential amplifier 14 and the output therefrom is waveform shaped by waveform shaping circuit 16, thereby obtaining a signal d which is at a low level when the second position detecting element 5 is detecting an N pole and is at a high level when element 5 is detecting an S pole.

The signals c, d, obtained as noted above, allow NOR gate circuit 19 to output a signal e, as shown in FIG. 4, the signal e being a high level when $\theta_m = \pi/3 + \theta_1$ and $\theta_m = 4\pi/3 + \theta_5$, and a low level when $\theta_m = \pi$ and $\theta_m = 2\pi$. Signals d and e are fed to AND gate circuit 20 to obtain a signal f, i.e., a PG pulse signal, showing a rotary phase of rotor 7, the signal f, as shown in FIG. 4, being a high level only when $\theta_1 + \theta_2 + \pi/3 < \theta_m < \theta_1 + \theta_2 + \theta_3 + \pi/3$, in other words, only during the period of time when the first position detecting element 4 is detecting an S pole and the second position detecting element 5 is in a state of detecting the magnetic poles going from the second change to the third change.

Figure 5:
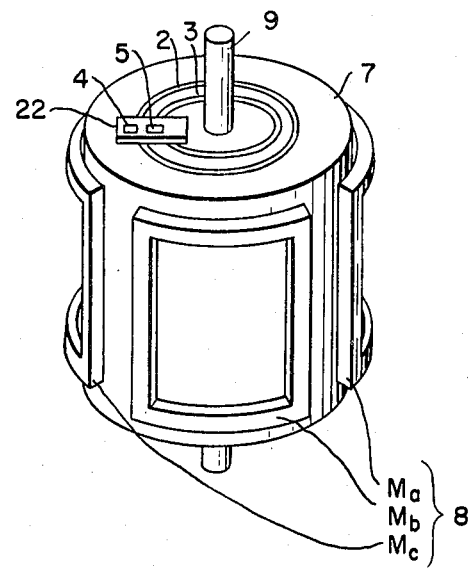
FIG. 5 is a perspective view of a principal portion of a modified embodiment of the invention.

FIG. 5 is a perspective view of the principal portion of a second embodiment of the invention, in which the same components as in FIG. 1 are designated by the same reference numerals. The second embodiment is provided with the first and second position detecting tracks 2 and 3 at non-magnetization portions of the permanent magnet constituting rotor 7. In this instance, N and S poles are coded and magnetized at the ratio as described in the first embodiment, the first and second position detecting elements 4 and 5 being disposed radially in the same direction and fixed to a plate 22 of the same carrier.

In addition, in the second embodiment, the pole positions between the first and second position detecting tracks 2 and 3 are arranged to be magnetized so as to obtain the signals a, $\bar{a}$ and b, $\bar{b}$ as described in the first embodiment.

Incidentally, the above embodiments form the first and second position detecting tracks through two magnetic states and use magnetic sensitive elements for position detecting. Alternatively, a proper well-known optical means may be available for the above purpose, which of course is included in the invention.

As seen from the above, the invention uses two position detecting elements for the three-phase brushless dc motor and obtains the PG signal without the use of other mechanical elements, thereby enabling a reduction in the manufacturing cost of the motor. Also, the two position detecting elements can be disposed radially in the same direction, thereby reducing the mounting error between the elements. Moreover, the two position detecting elements can be assembled on, for example, the same semiconductor substrate so as to be handled as one part, thereby having an advantage in achieving improvement of the management of parts. Furthermore, the two position detecting tracks are formed at the non-magnetization portion of the rotary magnet of the motor, thereby making it possible to obtain the above effect without increasing the number of parts.

What is claimed is:

1. A brushless dc motor comprising a rotor including a permanent magnet of 2n-poles (n: an integer), a stator including three-phase stator windings, a position signal generator for generating a position signal corresponding to a rotating position of said rotor, and a current divider for controlling a period of time for energizing said three-phase stator windings according to said position signal, wherein said position signal generator comprises a position detecting rotary member, a first position detecting element, a second position detecting element, and a position detecting means, said position detecting rotary member being provided with a first position detecting track which is ring-like in shape and which has two states, A and B, which are different in physical properties and which are coded sequentially at an angular ratio of approximately 1 to 2 corresponding to the number of the polarities of said permanent magnet and being provided with a second position detecting track which is ring-like in shape and which has two states which are different in physical properties and which are coded sequentially at a different angular position from said first position detecting track, and rotating integrally with said rotor, said first position detecting element detecting said coded physical state of said first position detecting track corresponding to a rotating position of said position detecting rotary member, said second position detecting element detecting said coded physical state of said second position detecting track, said position detecting means providing a coding ratio of said two coded physical states of said second position detecting track and mounting said second position detecting element, so that within a zone where said first position detecting element detects the physical state A, said physical state detected by said second position detecting element changes an odd number of times and at a substantially central angle of an angular width in which said first position detecting element detects said physical state B, and said physical state detected by said first position detecting element changes once.

2. A brushless dc motor according to claim 1, wherein said position signal generator comprises a position detecting means which is arranged so that the physical state detected by said second position detecting element changes three times in one zone of n zones where said first position detecting element detects said physical state A during every rotation of said rotor and the physical state detected by said second position detecting element change once in the other n-1 zones; and a PG signal generating means which is fed outputs from said first position detecting element and said second position detecting element, and which outputs a PG pulse signal representing a period of time from the second change to the third change of said physical state detected by said second position detecting element within the period of time when said first position detecting element detects the physical state A.

3. A brushless dc motor according to claims 1 or 2, wherein said first and second position detecting tracks are positioned on the same plane or cylindrical surface and include permanent magnets coded by N and S poles, said first and second position detecting elements comprising magnetic sensitive elements utilizing the Hall effect, said current divider comprising a first differential circuit for differentially-outputting an output current from a current supply according to an output of said first position detecting element and a second differential circuit for differentially-outputting one output current from said first differential circuit according to an output of said second position detecting element, wherein said three-phase stator windings each are energized according to the output current of said first differential circuit and the differential output current of said second differential circuit, thereby generating a rotating force.

4. A brushless dc motor according to claim 3, wherein said first and second position detecting elements are provided on the same carrier plate and disposed radially thereof in the same direction.

5. A brushless dc motor according to claim 4, wherein said position detecting rotary member is integral with said permanent magnet constituting said rotor.

6. A brushless dc motor according to claim 3, wherein said position detecting rotary member is integral with said permanent magnet constituting said rotor.

* * * * *